(12) United States Patent
Nguyen

(10) Patent No.: US 6,464,863 B1
(45) Date of Patent: Oct. 15, 2002

(54) TRANSMISSION FLUID FILTER ASSEMBLY

(75) Inventor: Ledu Quoc Nguyen, Fayetteville, NC (US)

(73) Assignee: Arvin Technologies, Inc., Farmington Hills, MI (US)

( * ) Notice: Subject to any disclaimer, the term of this patent is extended or adjusted under 35 U.S.C. 154(b) by 0 days.

(21) Appl. No.: 09/974,463

(22) Filed: Oct. 10, 2001

(51) Int. Cl.⁷ .......................... B01D 35/02; B01D 35/06
(52) U.S. Cl. .................. 210/168; 210/223; 210/238; 210/416.5; 210/460; 210/DIG. 17
(58) Field of Search ................. 210/167, 168, 210/222, 223, 238, 314, 315, 416.5, 459, 460, 484, 485, 500.25, 912, DIG. 17

(56) References Cited

U.S. PATENT DOCUMENTS

| | | | |
|---|---|---|---|
| 2,435,517 A | * 2/1948 | Seltzer | 210/168 |
| 3,463,729 A | * 8/1969 | Bean | 210/168 |
| 4,657,671 A | * 4/1987 | Botstibere et al | 210/111 |
| 4,689,144 A | * 8/1987 | Holmes | 123/196 A |
| 4,995,971 A | 2/1991 | Droste et al. | |
| 5,314,625 A | 5/1994 | Farnelli | |
| 5,389,252 A | 2/1995 | Morrick | |
| 5,423,983 A | 6/1995 | Chiang | |
| 5,441,647 A | 8/1995 | Wascher et al. | |
| 5,468,529 A | 11/1995 | Kwon et al. | |
| 5,647,993 A | 7/1997 | Karp | |
| 5,702,598 A | 12/1997 | Lemon et al. | |
| 5,714,063 A | 2/1998 | Brunsting | |
| 5,716,517 A | 2/1998 | Lasky | |
| 5,814,211 A | 9/1998 | Leo | |
| 5,932,108 A | 8/1999 | Brunsting | |
| 5,997,812 A | 12/1999 | Burnham et al. | |
| 6,007,716 A | 12/1999 | Calvert | |
| 6,093,318 A | 7/2000 | Saho et al. | |
| 6,139,737 A | 10/2000 | Gizowski | |
| 6,207,050 B1 | 3/2001 | Holifield | |
| 6,210,572 B1 | 4/2001 | Tulchinskiy | |
| 6,270,667 B1 | 8/2001 | Nakamura | |

* cited by examiner

Primary Examiner—David A. Simmons
Assistant Examiner—Fred Prince
(74) Attorney, Agent, or Firm—Barnes & Thornburg

(57) ABSTRACT

A transmission fluid filter assembly includes a filter media, a fluid discharge conduit associated with the filter media, a magnetic particle trap, and a connector arranged to lie under the filter media and the magnetic particle trap. The connector is adapted to be coupled to a filter mount provided at an opening in a transmission pan to support the filter media, fluid discharge conduit, and magnetic particle trap in an interior region of a transmission pan containing transmission fluid to be filtered. The magnetic particle trap attracts and retains particles of ferrous material to minimize discharge of such particles from the transmission pan through the fluid discharge conduit.

20 Claims, 8 Drawing Sheets

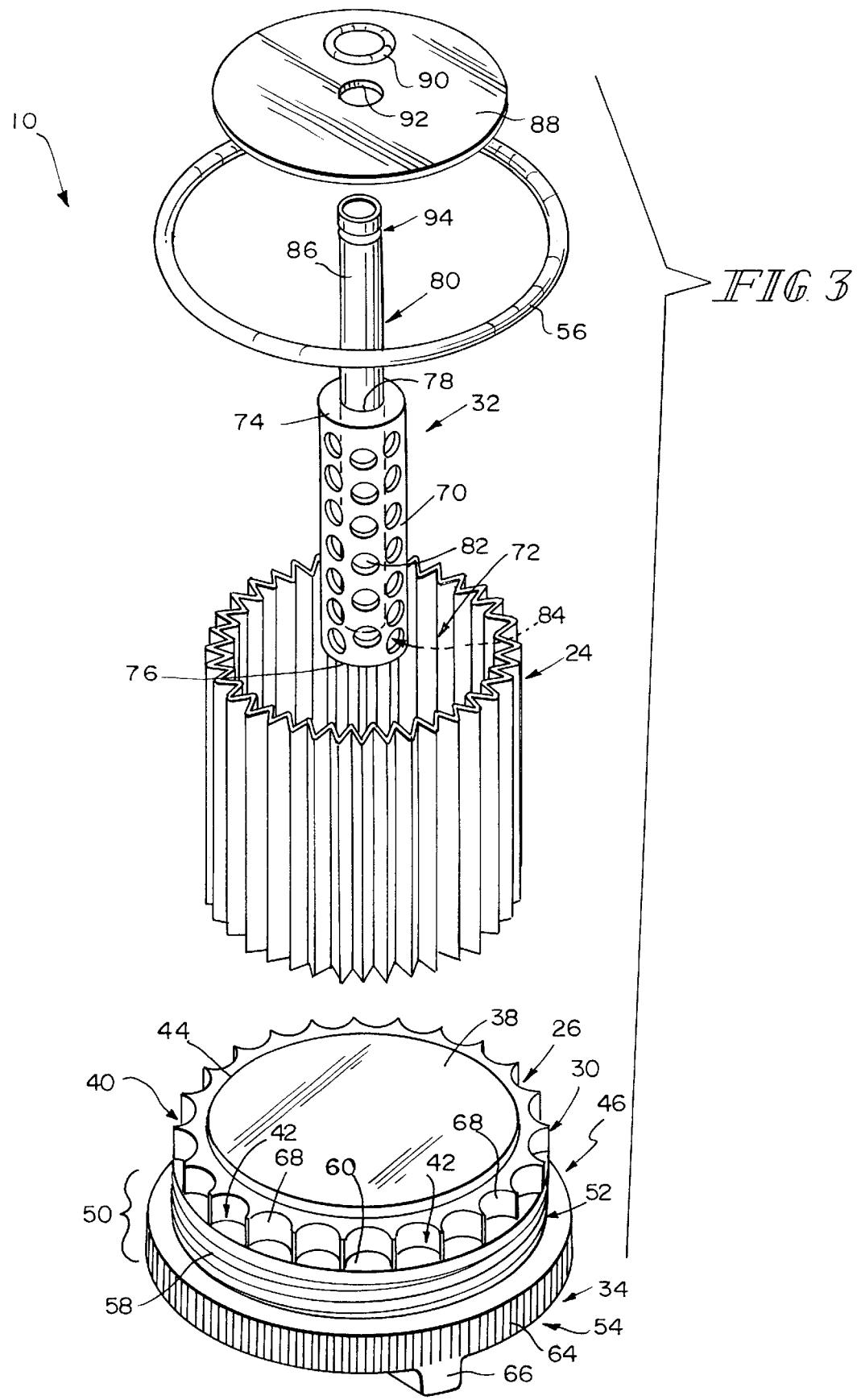

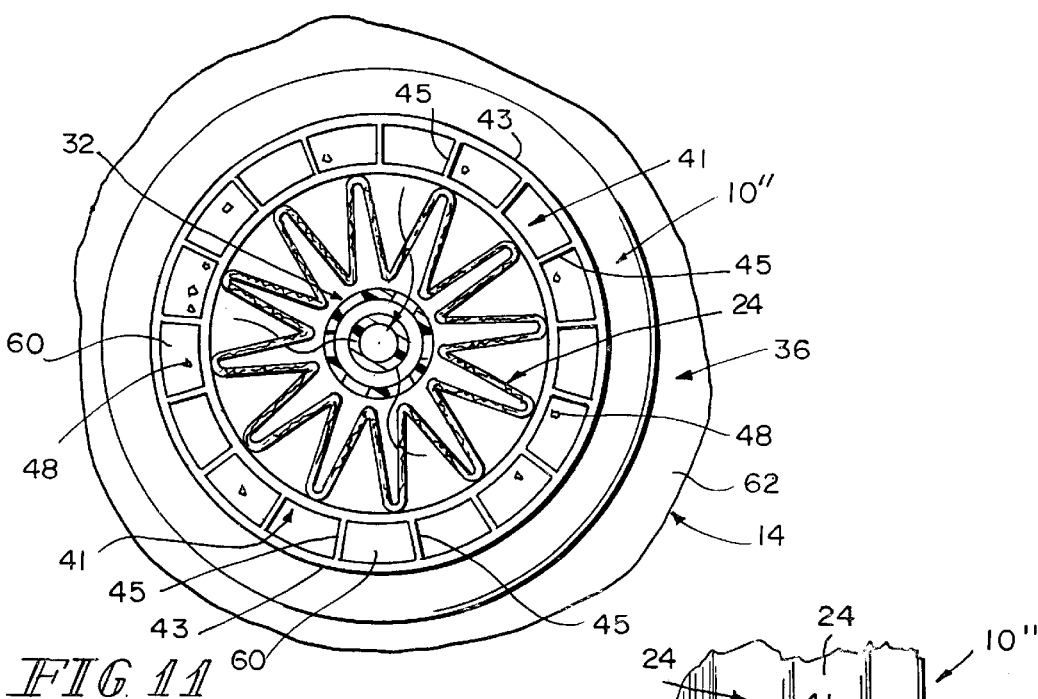
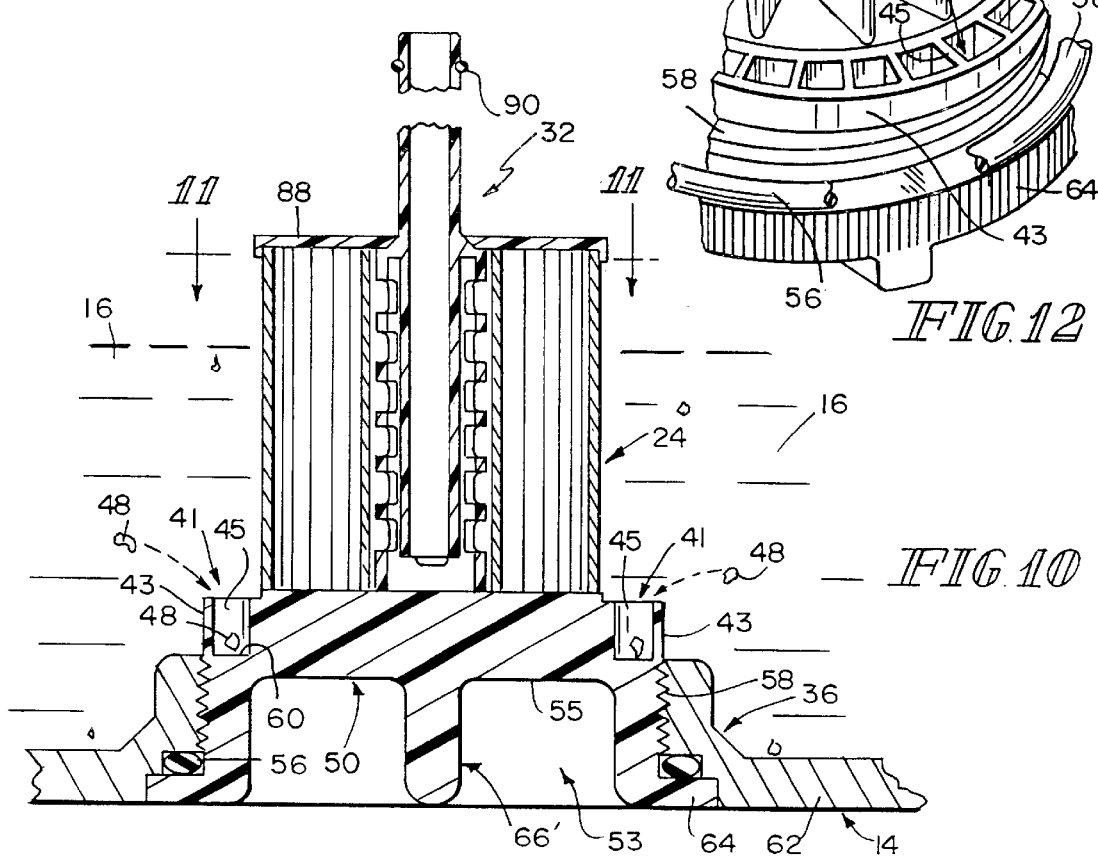

TRANSMISSION FLUID FILTER ASSEMBLY

BACKGROUND AND SUMMARY

The present disclosure relates to fluid filters, and in particular to filters for transmission fluid. More particularly, the present disclosure relates to fluid filter assemblies including magnetic and non-magnetic filters.

Transmissions include gears made of ferrous materials and particles of such materials break away from transmission gears and are carried in transmission fluid. Left unfiltered, such particles can become trapped in or otherwise clog transmission fluid passageways and disrupt fluid flow through the transmission.

According to the present disclosure, a transmission fluid filter assembly comprises a filter media, a discharge conduit coupled to the filter media, a magnetic particle trap associated with the filter media, and a connector arranged to lie under the filter media and the magnetic particle trap. The magnetic particle trap is magnetized to attract and retain particles of ferrous material carried in transmission fluid. The connector is adapted to be coupled to a filter mount provided at an opening in a transmission pan to support the filter media, discharge conduit, and magnetic particle trap in an interior region of a transmission pan containing transmission fluid to be filtered.

In illustrative embodiments, a monolithic member made of a plastics material containing a magnetic material is formed in a mold to include both the magnetic particle trap and the underlying connector. In one illustrative embodiment, the magnetic particle trap includes a plate arranged to lie under and support a filter media comprising a sleeve made of filter material and a trap section located between the plate and the connector and formed to include a series of ferrous particle-receiving notches arranged to lie around a perimeter edge of the plate. In another illustrative embodiment, the magnetic particle trap comprises a perforated cage formed to include an interior region receiving the filter media therein.

In operation, a pump coupled to the discharge conduit is used to draw transmission fluid conducted from a transmission into a transmission pan through the filter media and then transport filtered transmission fluid through the discharge conduit back to the transmission. Many particles of ferrous material carried in the transmission fluid will be attracted to and retained in the magnetic particle trap to minimize recirculation of those particles through the discharge conduit to the transmission.

Additional features of the present disclosure will become apparent to those skilled in the art upon consideration of the following detailed description of illustrative embodiments exemplifying the best mode of carrying out the present disclosure as presently perceived.

BRIEF DESCRIPTION OF THE DRAWINGS

The detailed description particularly refers to the accompanying figures in which:

FIG. 3 is an exploded perspective view of one embodiment of the fluid filter shown in FIG. 2 showing (from bottom to top) a pan connector carrying a grip handle on a lower side and providing a threaded portion on an upper side, a magnetic particle trap provided on top of the threaded portion, a filter media above the magnetic particle trap, a discharge conduit adapted to be inserted into a central interior region formed in the filter media, a large O-ring seal to be mounted between the pan and an annular surface on the pan connector surrounding the threaded portion, a round top end disk, and a small O-ring seal to be mounted between the discharge conduit and the pan;

FIG. 10 is a sectional view showing yet another illustrative view of the fluid filter of FIG. 2 wherein the magnetic particle trap is formed to include particle receiving wells around the periphery thereof;

FIG. 11 is a sectional view taken along line 11—11 of FIG. 10;

FIG. 12 is a partial perspective view of a portion of the fluid filter shown in FIGS. 9 and 10, showing some of the particle-receiving wells;

DETAILED DESCRIPTION OF THE DRAWINGS

Figure 1:
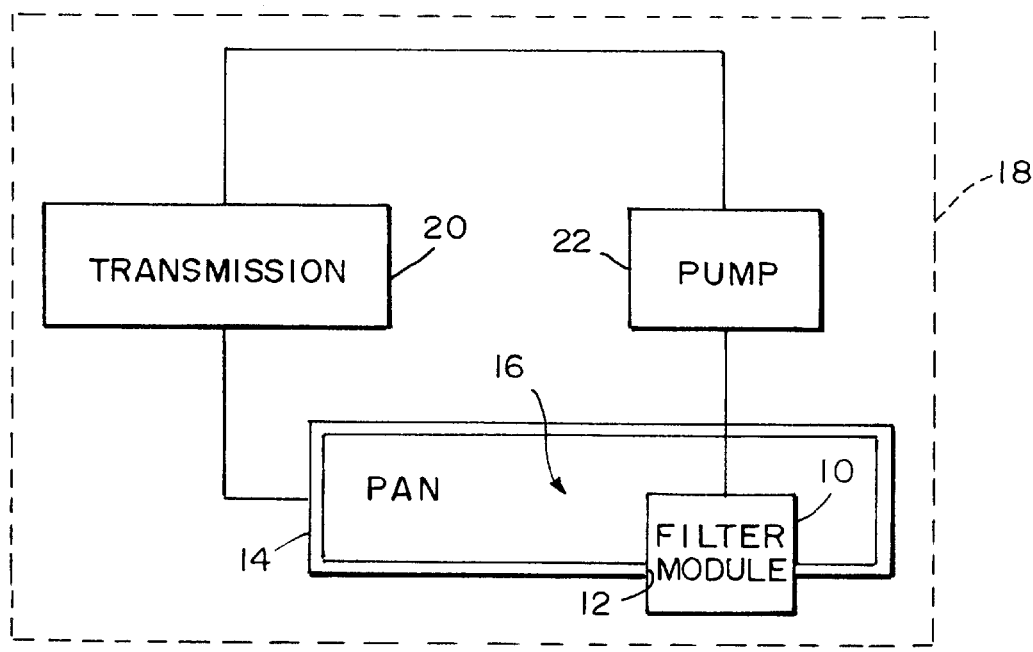
FIG. 1 is a diagrammatic view of a vehicle transmission system comprising a transmission, a pan, a filter in accordance with the present disclosure coupled to the pan to filter fluid discharged from the pan, and a pump arranged to pump filtered fluid to the transmission.

A filter module 10 is adapted to be mounted in an aperture 12 provided in a transmission pan 14 to filter transmission fluid 16 in pan 14 as shown diagrammatically in FIG. 1. In a vehicle transmission system 18, pan 14 receives transmission fluid 16 discharged from transmission 20 and pump 22 draws unfiltered fluid 16 through filter module 10 and causes filtered fluid 16 discharged from filter module 10 to be recirculated to transmission 20 as suggested in FIG. 1. In illustrative embodiments shown, for example, in FIGS. 2, 13, and 15, each of modules 10, 110, and 210 includes a filter media 24 and one or more magnetic particle traps 26 associated with filter media 24 and configured to attract and retain any nearby particles of ferrous material discharged from transmission 20 and carried in transmission fluid 16 admitted into pan 14 so as to minimize recirculation of such ferrous material particles to transmission 20 via pump 22.

Figure 2:
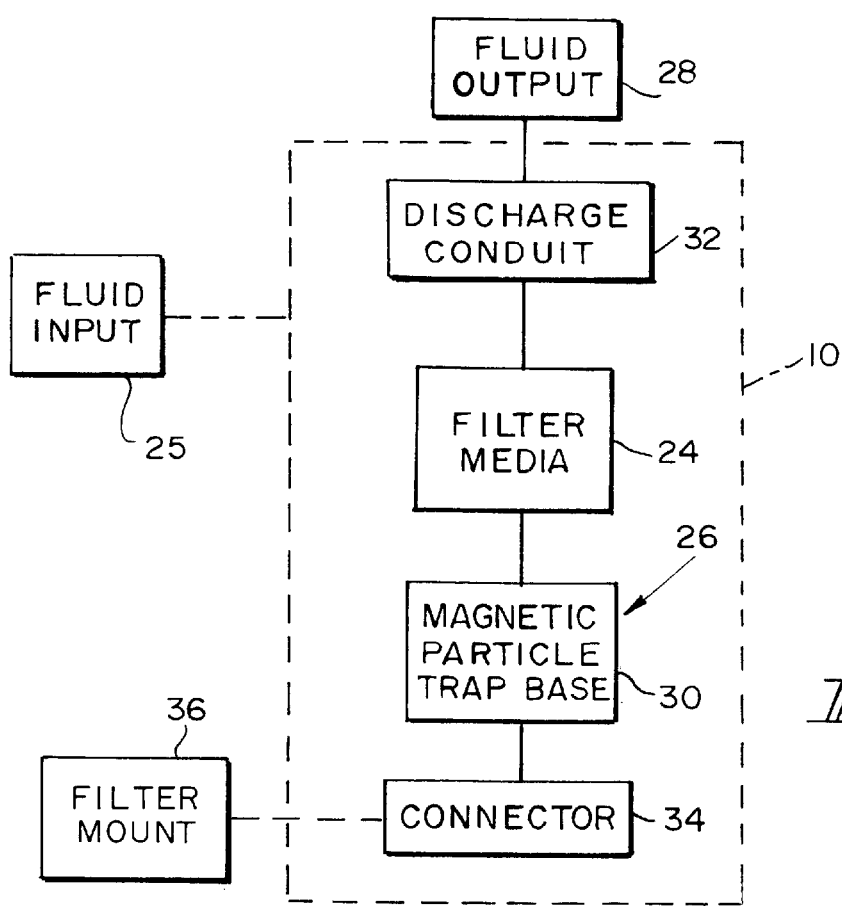
FIG. 2 is a diagrammatic view of one illustrative embodiment of the fluid filter shown in FIG. 1 showing a filter media, a magnetic particle trap provided below the filter media, a connector adapted to mate with the pan to expose the filter media and magnetic particle trap to transmission fluid in the pan, and a discharge conduit arranged to conduct transmission fluid filtered by the filter media and the magnetic particle trap to a fluid output destination outside of the pan.

Filter module 10 is adapted to receive unfiltered transmission fluid from fluid input 25 and discharge filtered transmission fluid to fluid output 28 as shown, for example, in FIG. 2. Filter module 10 comprises filter media 24, a magnetic particle trap base 30 under filter media 24, and a discharge conduit 32 arranged to conduct transmission fluid filtered by filter media 24 and magnetic particle trap base 30 to fluid output 28. Filter module 10 also comprises a connector 34 adapted to mate with a filter mount 36 associated, for example, with aperture 12 provided in transmission pan 14. Connector 34 mates with pan 14 to support filter media 24 and magnetic particle trap base 30 to expose filter media 24 and base 30 to transmission fluid 16 in pan 14 and to support discharge conduit 32 in fluid communication with filter media 24 and fluid output 28. In operation, magnetic particle trap base 30 is configured to attract and retain nearby ferrous material particles carried in transmission fluid supplied by fluid input 26 to filter module 10 so that discharge of such particles to fluid output 28 through discharge conduit 32 is minimized.

One illustrative embodiment of filter module 10 is shown in FIGS. 3–6. Filter media 24 comprises a sleeve made of filter material and magnetic particle trap base 30 comprises a plate 38 arranged to lie under and support filter sleeve 24 and a trap section 40 formed to include a series of ferrous material particle-receiving notches 42 arranged to lie around a perimeter edge 44 of plate 38 as shown best in FIG. 3. As also shown, for example, in FIGS. 3 and 6, plate 38, trap section 40, and a body portion 50 of connector 34 are made of a magnetic plastics material and united to form a monolithic member 46. It is within the scope of this disclosure to mix any suitable compounds and magnetized materials to produce a magnetic plastics material that will attract and retain ferrous material particles 48 (shown in FIG. 6) entrained in transmission fluid 16.

Figure 4:
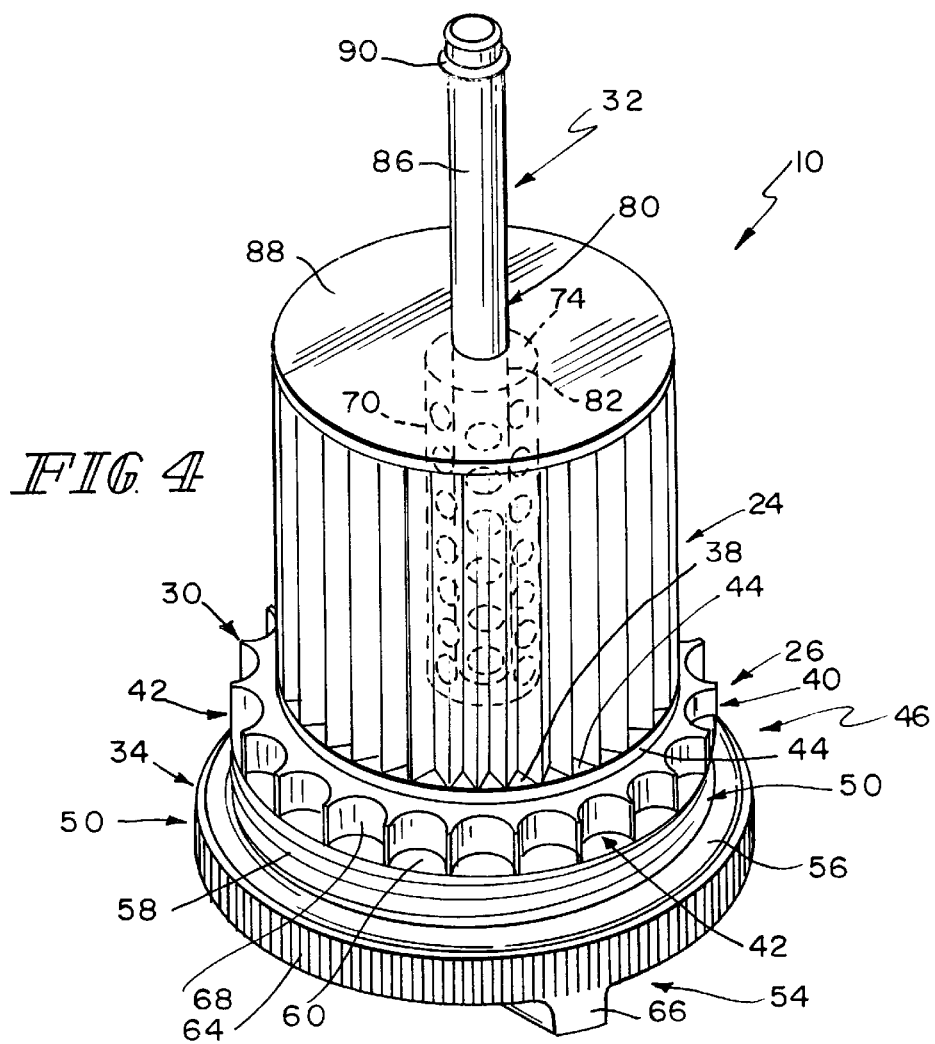
FIG. 4 is a perspective view of a fluid filter made using the components shown in FIG. 3.
Figure 7:
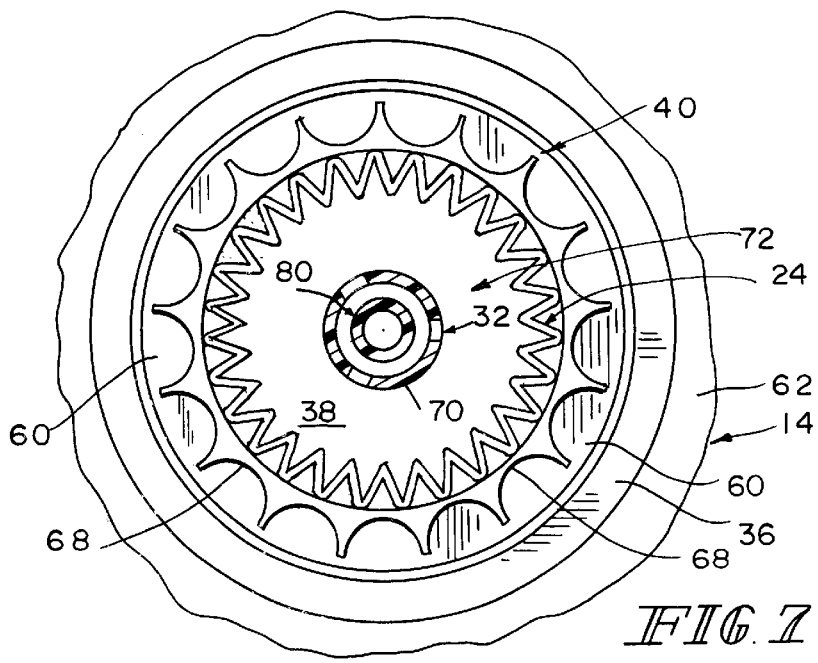
FIG. 7 is a sectional view taken along line 7—7 of FIG. 6 showing a portion of the discharge conduit in a central interior region formed in the filter media.
Figure 6:
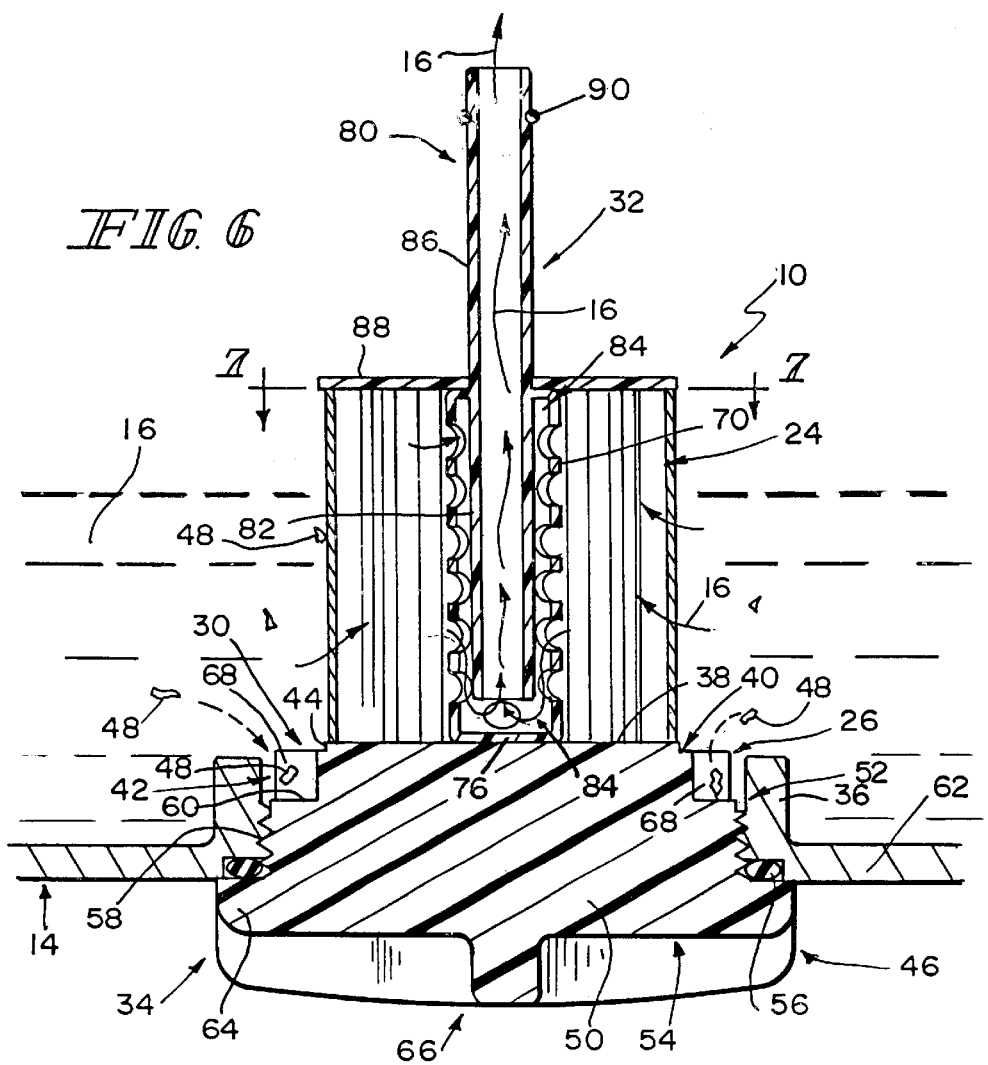
FIG. 6 is a sectional view showing the fluid filter of FIG. 4 mounted in an opening formed in a transmission pan along the lines suggested in FIG. 1.

Connector 34 comprises a body 50 including an axially upper portion 52 and an axially lower portion 54 as shown best in FIG. 3. Connector 34 also comprises an O-ring 56 shown in FIG. 3 and sized to extend around body 50 as shown in FIGS. 4 and 6. Body 50 is made of a magnetic plastics material and is united with magnetic particle trap base 30 to provide monolithic member 46 as described above.

As shown in FIGS. 3 and 6, axially upper portion 52 of body 50 of connector 34 includes exterior connection portions 58 (e.g., threads) and an axially upwardly facing surface 60 above exterior connection portions 58. As shown in FIG. 6, exterior connection portions 58 are adapted to engage a mating filter mount collar 36 provided at aperture 12 formed in a floor 62 in transmission pan 14. It is within the scope of this disclosure to use threads or any suitable system to couple body 50 of connector 34 to filter mount 36 associated with transmission pan 14.

Figure 5:
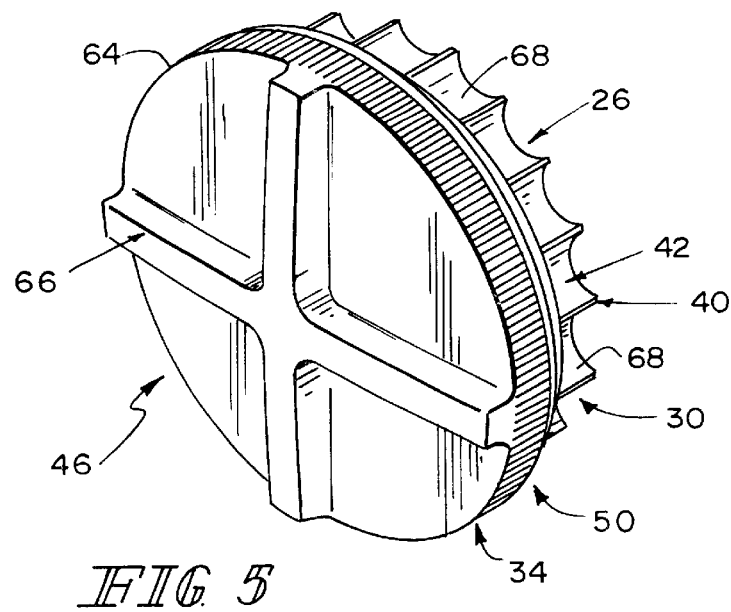
FIG. 5 is a perspective view showing the hand grip provided on the lower side of the pan connector and the magnetic particle trap provided above an upper side of the pan connector.

Axially lower portion 54 of body 50 of connector 34 includes a radially outwardly extending annular flange 64 and a hand grip 66 as shown, for example, in FIGS. 3 and 5. O-ring seal 56 is positioned to lie around body 50 and against annular flange 64 as shown best in FIG. 6. In an illustrative embodiment shown in FIG. 5, hand grip 66 has a shape resembling a "plus sign." Serrations are provided on outer edge of annular flange 64 as shown to allow a user to grip that portion of connector 34 to facilitate "hand-torque" installation of filter module 10 in aperture 12 provided in pan 14.

As shown in FIGS. 3–6, trap section 40 of magnetic particle tap base 30 includes a series of "scallop-shaped", radially outwardly opening, concave, curved, exterior side walls 68 arranged in circumferentially spaced-apart relation to one another about an outer periphery of trap section 40. Each side wall 68 cooperates with an adjacent portion of axially upwardly facing surface 60 to form one of the ferrous material particle-receiving notches 42. Thus, axially upwardly facing surface 60 is positioned to lie around and adjacent to the "scallop-shaped" periphery 68 of trap section 40 to provide a floor for each particle-receiving notch 42. It is within the scope of this disclosure to vary the size and shape of each side wall 68 and the associated notch floor.

By molding monolithic member 46 using a magnetic plastics material, the side wall 68 and floor 60 associated with each particle-receiving notch 42 comprise a magnetic material to provide means for attracting and retaining in notches 42 any nearby particles 48 of ferrous material (see FIG. 6) carried in transmission fluid 16 and in close proximity to notches 42. It is within the scope of this disclosure to apply a magnetic coating (not shown) to one or both of side walls 68 and floor 60 or form one or both of side walls and floor of a magnetic material.

One illustrative embodiment of discharge conduit 32 is shown in FIG. 3. Discharge conduit 32 includes a perforated outer sleeve 70 sized to extend into an interior region 72 provided in filter media 24 and formed to include axially upper and lower ends 74, 76. Axially upper end 74 is formed to include an end aperture 78. A discharge tube 80 extends through end aperture 78 and includes an axially lower end 82 lying in an interior region 84 of perforated outer sleeve 70 and an axially upper end 86 lying outside of interior region 84. In an illustrative embodiment, perforated outer sleeve 70 and discharge tube 80 are made of a plastics material and united to produce a monolithic discharge conduit 32. It is within the scope of this disclosure to include a magnetic material in and/or on perforated outer sleeve 70 to provide means for attracting and retaining any nearby ferrous material particles 48 that may have reached interior region 72 in filter media 24.

As shown in FIGS. 3, 4, and 6, in an illustrative embodiment, filter module 10 further comprises a top end plate 88 and an O-ring seal 90. Top end plate 88 is formed to include a central aperture 92 through which axially upper portion 86 of discharge tube 80 extends. Top end plate 88 is located to set on axially upper end 74 of perforated outer sleeve 70 when the components comprising filter module 10 are assembled. O-ring seal 90 is sized to fit in an annular groove 94 formed near an axially outer end of axially upper portion 86 so as to establish sealing contact with transmission pan 14 or other structure once filter module 10 is mounted in pan 14. It is within the scope of this disclosure to provide other suitable means for discharging filtered fluid from an interior region of filter media 24 to a remote location outside of transmission pan 14.

When filter module 10 is assembled, axially lower end 76 of perforated outer sleeve 70 engages plate 38 of magnetic particle trap base 30 and axially lower end 82 of discharge tube 80 is arranged in interior region 84 to lie above and in spaced-apart relation to axially lower end 76 of perforated outer sleeve 70 as shown, for example, in FIG. 6. Thus, transmission fluid 16 present in interior region 72 of filter media 24 will be constrained to pass first through perforations in outer sleeve 70 and then into interior region 84 of outer sleeve 70 before being admitted into discharge tube 80 through axially lower end 76 thereof as such filtered transmission fluid 16 is pumped out of filter module 10 through discharge conduit 32. Axially lower end 76 of perforated outer sleeve 70 is positioned to lie adjacent to magnetic particle trap base 30 so that axially lower end 76 extends to or near to magnetic particle trap base 30.

One way to assemble the filter module components is to bond a lower. end of filter media 24 to plate 38 and bond an upper end of filter media 24 to top end plate 88. Infrared, hot-plate bonding, or other suitable bonding processes may be used to bond filter media 24 to plates 38, 88. Before lower end of filter media 24 is bonded to plate 38, discharge conduit 32 can be passed up "from the bottom" through interior region 72 of filter media 24 and through central aperture 92 formed in top end plate 88. Discharge conduit 32 can be bonded to top end plate 88 by spin-welding or other suitable technique. By appropriate design, these components may be molded as one or more units rather than as individual components to be bonded together.

Figure 9:
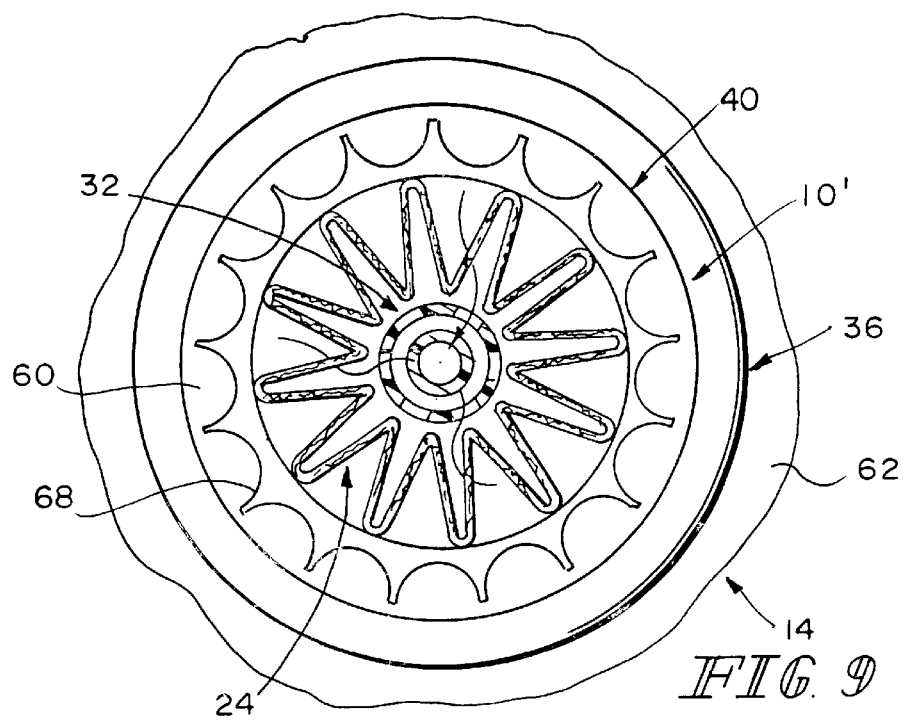
FIG. 9 is a sectional view taken along line 9—9 of FIG. 8 showing another style of filter media.
Figure 8:
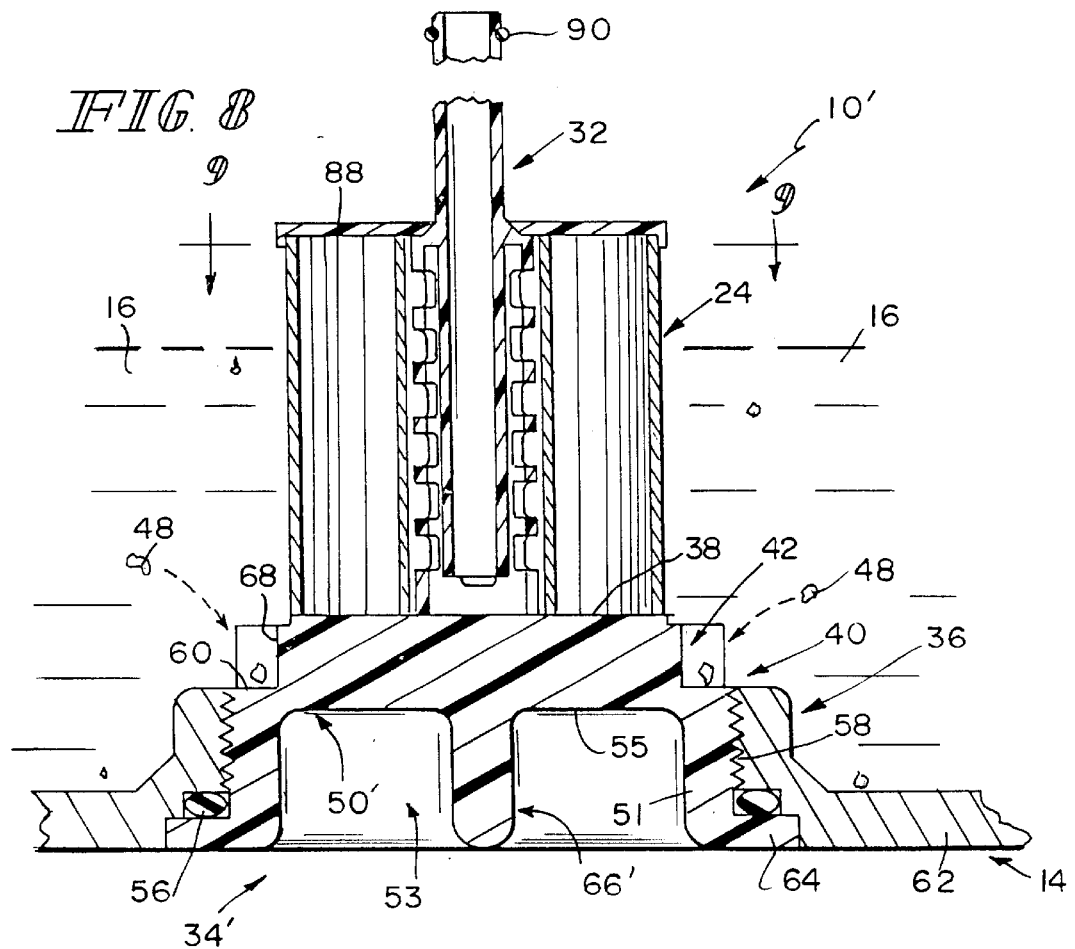
FIG. 8 is a sectional view showing another illustrative view of the fluid filter shown in FIG. 2 wherein a lower portion of the pan connector has been modified to mount flush with the bottom exterior surface of the transmission pan and an upper portion of the pan connector has been modified to place the magnetic filter trap in a position above a filter mount collar provided in an interior region of the transmission pan.

Another embodiment of filter module 10 shown in FIG. 2 is illustrated in FIGS. 8 and 9 as filter module 10'. In this embodiment, the connector has been modified to fit completely within an opening formed in bottom wall 62 of transmission pan 1 so as to lie "flush" to a bottom exterior surface of pan 14. This structure is similar in other respects to filter module 10 of FIGS. 3–7 and provides a hand grip 66' recessed in an interior region formed in the connector.

Connector 34' includes a body 50' and an O-ring seal 56. Body 50' includes a cylindrical sleeve 51 having an axially upper portion providing axially upwardly facing surface 60 and exterior connection portions 58 (e.g., threads). Cylindrical sleeve 51 also includes an axially lower portion providing an interior region 53 and radially outwardly extending annular flange 64. Hand grip 66' is positioned to lie in interior region 53 of cylindrical sleeve 51 and appended to axially downwardly facing surface 55.

Another embodiment of filter module 10 shown in FIG. 2 is illustrated in FIGS. 10–12 as filter module 10". In this embodiment, magnetic particle trap base 40' is formed to include a series of circumferentially spaced-apart particle-receiving wells 41 (in contrast to notches 42 shown, for example, in FIGS. 8 and 9) around the periphery thereof. Each well 41 is defined by a curved outer side wall 43 and a pair of spaced-apart radially extending side walls 45 and a floor defined by axially upwardly facing surface 60. Wells 41 are sized to receive ferrous material particles therein as shown, for example, in FIGS. 10 and 11. In all other respects, filter module 10" is similar to filter module 10'.

Figure 13:
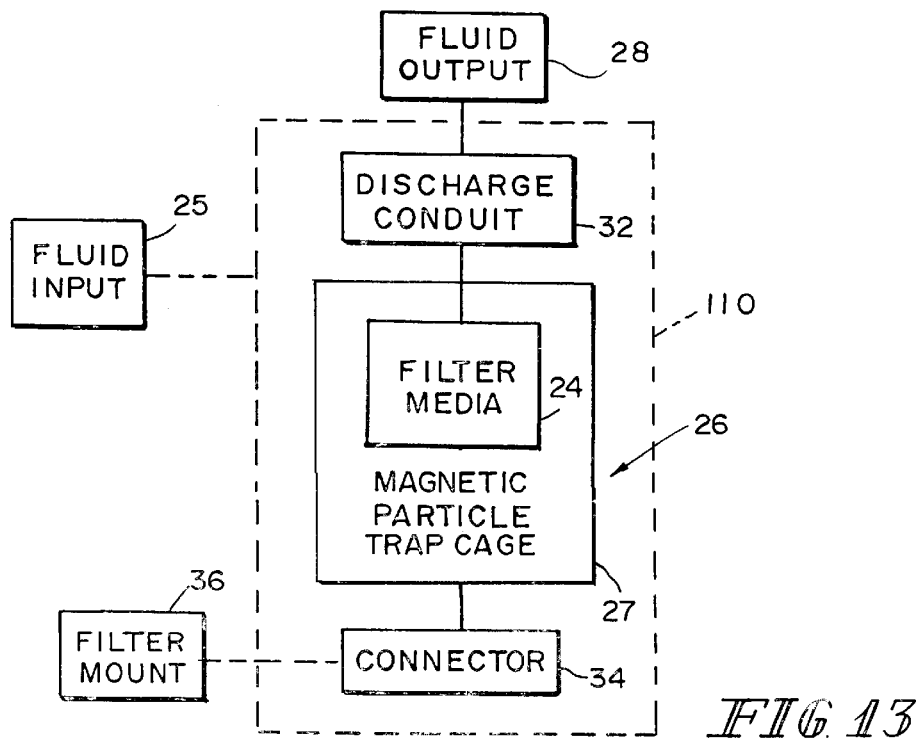
FIG. 13 is a diagrammatic view of another illustrative embodiment of a fluid filter shown in FIG. 1 showing a filter media housed in a magnetic particle trap cage, a connector adapted to mate with the pan to expose the filter media and surrounding magnetic particle trap cage to transmission fluid in the pan, and a discharge conduit arranged to conduct transmission fluid filtered by the filter media and the magnetic particle trap cage to a fluid output destination outside of the pan.
Figure 14:
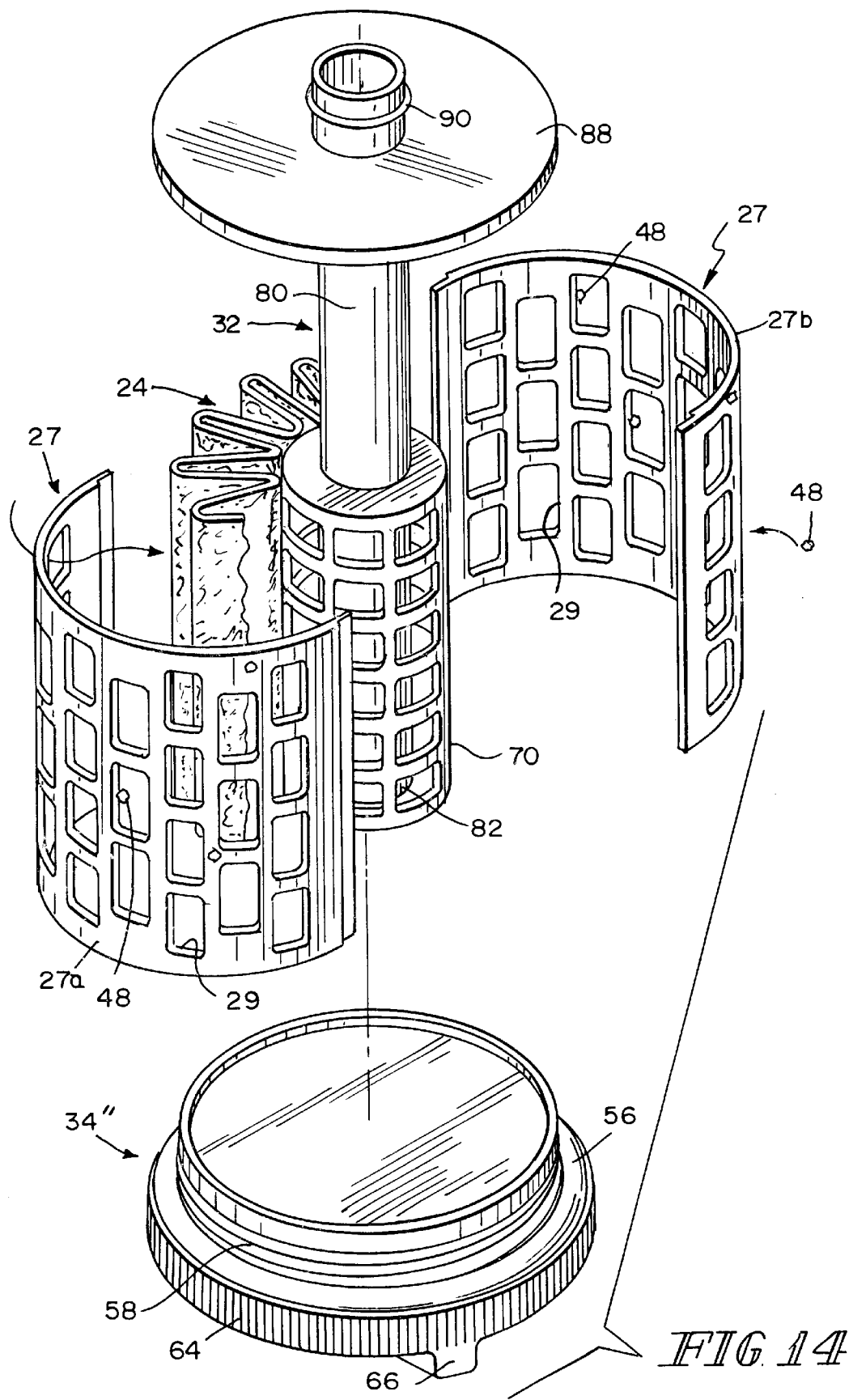
FIG. 14 is an exploded perspective view of one embodiment of the fluid filter shown in FIG. 13.

Another illustrative embodiment of a filter module of the type shown in FIG. 1 is illustrated diagrammatically in FIG. 13 as filter module 110. In this embodiment, magnetic particle trap 26 is defined by a magnetic particle trap cage 27 around filter media 24 instead of a magnetic particle trap base 30 under filter media 24. One example of such a cage 27 is shown in FIG. 14. In that illustration, cage 27 comprises two semi-cylindrical perforated shell haves 27a and 27b which can mate with one another to provide a perforated sleeve located between top end plate 88 and connector 34". Each half 27a, b is formed to include openings 28 to allow transmission fluid to flow therethrough and reach filter media 24 received therein. Cage 27 is made of a magnetic plastics material to attract and retain ferrous material particles 48 thereon and/or in openings 29. It is within the scope of this disclosure to provide a monolithic perforated cage having a cylindrical or other suitable shape.

Figure 15:
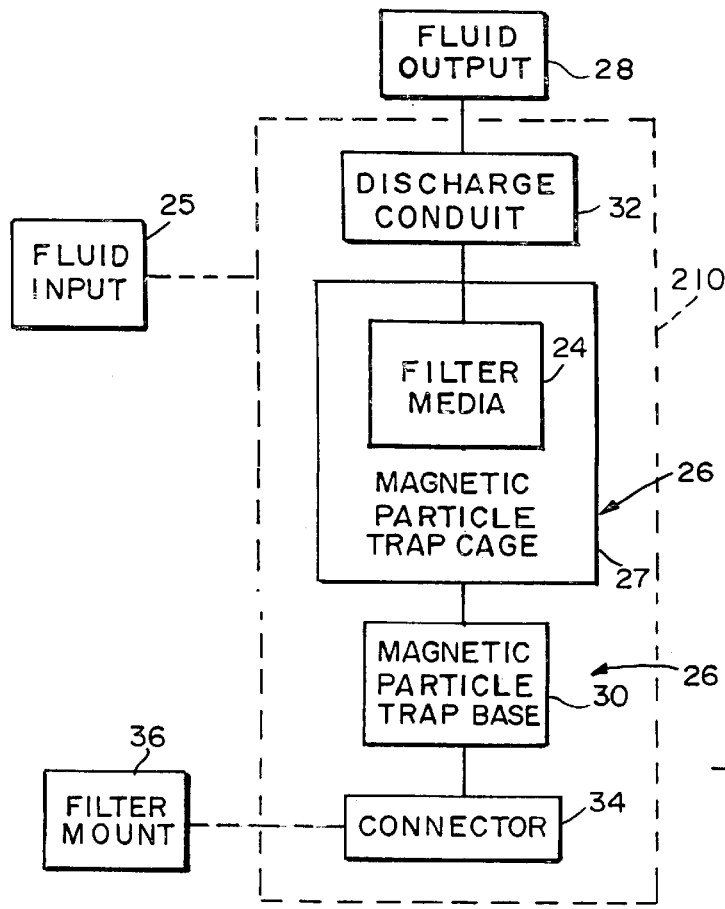
FIG. 15 is a diagrammatic view of yet another illustrative embodiment of a fluid filter shown in FIG. 1 showing a filter media housed in a magnetic particle cage, a magnetic particle trap provided below the filter media and the magnetic particle cage, a connector adapted to mate with the pan to expose the filter media and surrounding magnetic particle cage and underlying magnetic particle trap to transmission fluid in the pan, and a discharge conduit arranged to conduct transmission fluid filtered by the filter media and magnetic particle cage to a fluid output destination outside of the pan.

Yet another illustrative embodiment of a filter module of the type shown in FIG. 1 is illustrated diagrammatically in FIG. 15. Two magnetic particle traps 26 are included in filter module 210. Magnetic particle trap cage 27 functions as one of the traps 26 while magnetic particle trap base 30 functions as the other of the traps 26.

Each magnetic particle filter trap 26 is made using a plastic compound that is mixed such that it can be magnetized to help trap particles of ferrous material carried in transmission fluid. The filter module incorporates slots or cavities that allow particles caught by magnetic attraction to become entrapped. By integrating the entire filter, connector plug, and outlet piping, the number of components is minimized. This integration allows for easy processing at the production level and inclusion of threads and seals in the filter module permit easy and reliable installation and removal of the filter module relative to the transmission pan.

What is claimed is:

1. A transmission fluid filter assembly for filtering transmission fluid in a transmission pan, the filter assembly comprising
   a filter media,
   a magnetic particle trap associated with the filter media and magnetized to attract particles of ferrous material in close proximity to the filter media,
   a connector arranged to lie under the filter media and the magnetic particle trap and adapted to mate with a transmission pan to expose the filter media and magnetic particle trap supported above the connector to transmission fluid and any particles of ferrous material in the transmission fluid extant in an interior region of the transmission pan, and
   a discharge conduit arranged to extend into the filter media to conduct transmission fluid filtered by the filter media and the magnetic particle trap to a remote fluid output destination.

2. The filter assembly of claim 1, wherein the magnetic particle trap includes an axially upper surface facing toward the filter media and a peripheral side edge arranged to depend from the axially upper surface and formed to define a series of particle-receiving notches around an outer periphery of the magnetic particle trap.

3. The filter assembly of claim 2, wherein the peripheral side edge comprises a magnetic material to provide means for attracting and retaining in the particle-receiving notches any nearby particles of ferrous materials carried in transmission fluid and in close proximity to the particle-receiving notches.

4. The filter assembly of claim 2, wherein the connector includes an axially upwardly facing surface positioned to lie around and adjacent to the peripheral side edge to provide a floor for each particle-receiving notch.

5. The filter assembly of claim 4, wherein the peripheral side edge of the magnetic particle trap and the axially upwardly facing surface of the connector each comprise a magnetic material to provide means for attracting and retaining in the particle-receiving notches any nearby particles of ferrous materials carried in transmission fluid and in close proximity to the particle-receiving notches.

6. The filter assembly of claim 2, wherein the connector includes a body provided with exterior threads adapted to engage a threaded collar providing an opening in the transmission pan, a radially outwardly extending annular flange coupled to the body, and an O-ring seal positioned to lie around the body and against the annular flange.

7. The filter assembly of claim 6, wherein the body includes an axially upwardly facing surface located above the exterior threads and positioned to lie around and adjacent to the peripheral side edge to provide a floor for each particle-receiving notch.

8. The filter assembly of claim 2, wherein the connector includes a body provided with exterior connection portions adapted to engage a mating collar providing an opening in the transmission pan, an axially upwardly facing surface located above the connection portions and around and adjacent to the peripheral side edge to provide a floor for each particle-receiving notch, a radially outwardly extending annular flange coupled to the body and a hand grip associated with the annular flange, and an O-ring seal positioned to lie around the body and against the annular flange.

9. The filter assembly of claim 8, wherein the body includes an axially upper portion providing the axially upwardly facing surface and the connection portions and an axially lower portion providing the radially outwardly extending annular flange and the hand grip.

10. The filter assembly of claim 8, wherein the body includes a cylindrical sleeve having an axially upper portion providing the axially upwardly facing surface and the connection portions and an axially lower portion carrying the radially outwardly extending annular flange and the cylindrical sleeve is formed to include an interior region containing the axially downwardly facing surface and the hand grip coupled to the axially downwardly facing surface.

11. The filter assembly of claim 1, wherein a monolithic member made of a magnetic plastics material is configured to define the magnetic particle trap and the connector.

12. The filter assembly of claim 1, wherein the discharge conduit includes a perforated outer sleeve having an axially lower end positioned to lie adjacent to the magnetic particle trap and an opposite axially upper end formed to include an end aperture therein and a discharge tube extending through the end aperture and having an axially lower end lying in an interior region of the perforated outer sleeve and above and in spaced-apart relation to the axially lower end of the perforated outer sleeve and an axially upper end lying outside of the interior region of the perforated outer sleeve and away from the filter media.

13. The filter assembly of claim 12, wherein the perforated outer sleeve is made of a magnetized plastics material to attract and retain thereon any nearby particles of ferrous materials that have passed through the filter media to reach the discharge conduit.

14. The filter assembly of claim 1, wherein the filter media comprises a sleeve made of filter material and the magnetic particle trap comprises a plate arranged to lie under and support the filter sleeve and a trap section formed to include a series of particle-receiving notches arranged to lie around a perimeter edge of the plate.

15. The filter assembly of claim 14, wherein the connector is arranged to lie under the plate to locate the trap section therebetween and the plate, trap section, and connector are made of a magnetic plastics material and united to form a monolithic member.

16. The filter assembly of claim 15, wherein the connector includes a hand grip and exterior threads adapted to engage a threaded collar providing an opening into the transmission pan and positioned to lie between the trap section and the hand grip.

17. A transmission fluid filter assembly for filtering transmission fluid in a transmission pan, the filter assembly comprising a filter media, a magnetic particle cage formed to include an interior region receiving the filter media therein and magnetized to attract particles of ferrous material carried in transmission fluid in close proximity to the filter media, a connector arranged to lie under the filter media and the magnetic particle cage and adapted to mate with a transmission pan to expose the filter media and the magnetic particle cage receiving the filter media to transmission fluid and any particles of ferrous material in the transmission fluid extant in an interior region of the transmission pan, and a discharge conduit arranged to extend into the filter media to conduct transmission fluid filtered by the magnetic particle cage and the filter media to a remote fluid output destination.

18. The filter assembly of claim 17, further comprising a magnetic particle trap positioned to lie under the filter media and the magnetic particle cage and magnetized to attract particles of ferrous material.

19. The filter assembly of claim 18, wherein the magnetic particle trap is formed to include a series of particle-receiving notches and the magnetic particle trap and the connector are made of a magnetic plastics material and united to form a monolithic member.

20. A transmission fluid filter assembly comprising a transmission pan formed to include an interior region, an opening into the interior region and a filter mount collar around the opening, a filter media comprising a sleeve made of filter material, a discharge conduit arranged to extend into the filter media to conduct transmission fluid filtered by the filter media to a remote fluid output destination outside of the transmission pan, and a monolithic member made of a magnetic plastics material, the monolithic member comprising a magnetic particle trap positioned to lie under the filter media and discharge conduit and formed to include a series of particle-receiving notches around an outer periphery thereof to retain therein any nearby particles of ferrous materials in the transmission fluid extant in the interior region of the transmission pan that are attracted to the magnetic particle trap, the monolithic member further comprising a connector positioned to lie under the filter media to locate the magnetic particle trap therebetween and formed to mate with the filter mount collar to expose the filter media and the magnetic particle trap to transmission fluid extant in the interior region of the transmission pan and any particles of ferrous material carried therein.

* * * * *